(No Model.)

C. S. EDWARDS.
TOY.

No. 500,567. Patented July 4, 1893.

Witnesses:
W. P. Smith.
Chas. B. Wait

Inventor:-
Cora S. Edwards.
By Higdon & Higdon Att'ys.

UNITED STATES PATENT OFFICE.

CORA S. EDWARDS, OF CENTROPOLIS, MISSOURI.

TOY.

SPECIFICATION forming part of Letters Patent No. 500,567, dated July 4, 1893.

Application filed September 3, 1892. Serial No. 444,963. (No model.)

*To all whom it may concern:*

Be it known that I, CORA S. EDWARDS, of Centropolis, Jackson county, Missouri, have invented certain new and useful Improvements in Toys, of which the following is a full, clear, and exact description, reference being had to the accompanying drawings, forming a part hereof.

My invention relates to a toy or game for children or others which will serve to train them in the skillful manipulation of the device to accomplish a given result, and also afford an amusing pastime.

The invention consists essentially in a box covered with glass to hold one or more fish or other suitable objects, and having a hook secured to the bottom of the box upon the interior thereof, upon which the fish may be hooked or caught.

Figure 1:
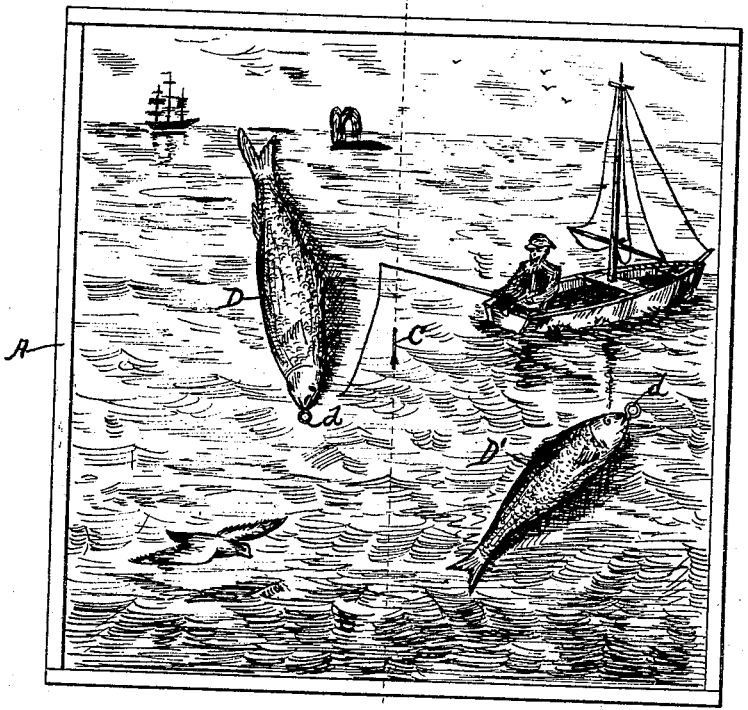
Figure 2:
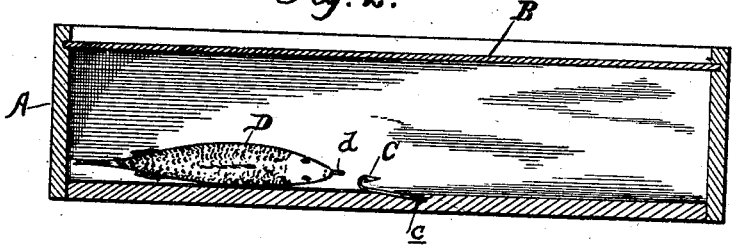

In the accompanying drawings, Figure 1 is a plan and Fig. 2 a transverse vertical cross-section on the line $x$—$x$ of Fig. 1, representing my invention.

The rectangular box A of suitable material, wood, metal, paper or glass is covered with a glass plate B, through which the interior of the box and its contents may be seen. The inner side of the bottom of the box is painted or preferably covered with a picture representing the ocean or a body of water with its waves and with sea-fowls and fish, and with vessels sailing upon it, a fisher-man in his boat casting his line, or other appropriate representations which will readily suggest themselves may be shown in the picture. A hook C is secured to the inner side or the bottom of the box with its barb or point projecting upward and may be secured firmly in place in an awl-hole passing obliquely into the wood, into which the head or loop end of the hook is inserted and a tack or staple $c$ is driven to indicate the enlargement of the head. One or more fish D D' are placed loosely inside the box and have each an eye or loop $d$, projecting from its mouth of barely sufficient size to freely pass over the hook.

The game is played by trying to catch the fish upon the hook which will require the skillful and patient movement of the box backward and forward out of a level plane to cause the fish to move about from place to place until the point of the hook passes through the eye or loop upon the fish. When one fish has been caught, the second will be more difficult to catch as the first fish is liable to interfere somewhat, and is also liable to become unhooked. A number of hooks placed at different points upon the bottom of the box may be employed and in that case a greater number of fish should also be employed, to increase the difficulty of skillfully accomplishing the feat.

Having thus described my invention, what I claim as new therein, and desire to secure by Letters Patent, is—

1. A toy or game comprising a box having one or more hooks secured to the inner side or bottom thereof, and one or more fish having a loop secured thereto to be caught upon the hook, substantially as described.

2. In a toy or game having a box provided with a transparent cover, and a picture or representation of a body of water, and objects thereon, in the bottom of the box, the combination of a hook secured to the inner side or bottom of said box, with a number of miniature fish having loops, adapted to engage the hook in the bottom of the box, substantially as set forth.

In testimony whereof I affix my signature in the presence of two witnesses.

CORA S. EDWARDS.

Witnesses:
M. R. REMLEY,
E. M. FITZPATRICK.